United States Patent [19]
Hardin et al.

[11] Patent Number: 6,123,012
[45] Date of Patent: Sep. 26, 2000

[54] TOASTER WITH MORE VARIED TOASTING FEATURES AND A SAFETY CONTROL

[75] Inventors: George Hardin; Cliff Spencer, both of Hattiesburg, Miss.

[73] Assignee: Sunbeam Products, Inc., Boca Raton, Fla.

[21] Appl. No.: 09/388,675

[22] Filed: Sep. 2, 1999

[51] Int. Cl.$^7$ .............................. A47J 37/08; H05B 1/02; H05B 3/06

[52] U.S. Cl. ...................... 99/326; 99/329 P; 99/329 RT; 99/331; 99/337; 99/342; 99/385; 99/389; 99/391; 219/492; 219/521

[58] Field of Search ............................. 99/325–333, 339, 99/340, 337, 338, 341, 342, 385–393; 219/518, 520, 521, 396, 398, 492, 494, 497, 481, 489; 392/373, 375, 337, 407

[56] References Cited

U.S. PATENT DOCUMENTS

| | | | |
|---|---|---|---|
| 4,110,600 | 8/1978 | Spotts et al. | 219/486 X |
| 4,154,151 | 5/1979 | Mochizuki | 99/329 R |
| 4,201,124 | 5/1980 | Huggler | 99/327 |
| 4,216,372 | 8/1980 | Huggler | 219/521 |
| 4,382,175 | 5/1983 | Huggler | 99/329 R |
| 4,394,563 | 7/1983 | Schnell | 392/373 |
| 4,455,319 | 6/1984 | Clark | 99/447 |
| 4,580,853 | 4/1986 | Hitzeroth et al. | 312/245 |
| 4,906,818 | 3/1990 | Lumpp et al. | 219/518 X |
| 5,018,437 | 5/1991 | San Juan | 219/492 X |
| 5,193,439 | 3/1993 | Finesman et al. | 99/327 |
| 5,304,782 | 4/1994 | McNair et al. . | |
| 5,385,082 | 1/1995 | Huggler et al. . | |
| 5,397,510 | 3/1995 | Clark | 219/521 X |
| 5,463,936 | 11/1995 | Clark et al. | 99/327 X |
| 5,644,974 | 7/1997 | Slavin . | |
| 5,664,481 | 9/1997 | Huggler . | |

*Primary Examiner*—Timothy Simone
*Attorney, Agent, or Firm*—Kramer Levin Naftalis & Frankel

[57] ABSTRACT

A toaster includes a housing having an upper wall with bagel half shaped openings; toasting chambers in the housing accessible through the openings and having bagel half shapes; a bread rack in each toasting chamber; inner/outer heating coils surrounding each toasting chamber; electric contacts in the housing for activation of the heating coils; a raising/lowering mechanism connected with the bread racks for moving the bread racks up and down, and including first and second lateral portions connected to opposite ends of the bread racks; first and second guides mounted to the housing for guiding the first and second lateral portions with a small tolerance, a yoke housing connected with the first lateral portion and slidably movable relative to the housing, a lever slidably moving the yoke housing; a yoke slidably movable relative to the yoke housing and closing the electric contacts when the bread racks and yoke are lowered, and a first spring biasing the yoke upwardly; an electromagnet holding the yoke in the lowered position; an input setting device for setting a toasting time and/or a desired food item; a microprocessor controlling the electromagnet to release the yoke after a predetermined cooking time and controlling activation of the heating coils in response to the input setting device; and LEDs on an outer surface visually indicating the toasting time progression.

18 Claims, 7 Drawing Sheets

TOASTER WITH MORE VARIED TOASTING FEATURES AND A SAFETY CONTROL

FIELD OF THE INVENTION

The present invention relates generally to toasters, and more particularly, is directed to a toaster providing varied toasting features and a safety control.

BACKGROUND INFORMATION

With conventional toasters, when a slice of toast or pastry gets lodged in the toast chamber during toasting, there generally is no fail-safe device for shutting off power to the heating elements. This can result in the toast or pastry being overcooked or burnt, and more importantly, can result in more hazardous occurrences, such as a fire.

Many currently available toasters rely on a timing circuit to release a solenoid or electromagnet which in turn releases the bread racks, along with a set of mechanical contacts for controlling voltage to the heating elements. The problem with these toasters occurs when the bread or pastry becomes jammed at the bottom of the toast rack and the electrical contacts are not sufficiently opened to turn off the heating elements.

Further, with existing toasters, the toast lowering mechanism is usually formed by bread racks, one per slot, connected at one end to a yoke assembly which slides vertically on a metal rod, and a knob for actuating the same. The opposite end of each bread rack is guided imprecisely in large slots punched out in the metal housing. This design translates to a loose, imprecise and noisy operator control.

Further, with many toasters there is no adequate display for indicating the shade of the toast, that is, such displays are not precise.

Still further, most slots for food are rectangular on existing toasters. However, with bread items which do not have planar sides, such as bagels, it is often desirable to toast only one side of the bagel. Currently, some toasters do attempt to offer this feature, using a mechanical lever to switch off certain sides of the slots, but this requires the user to consider which orientation the toast or bagel is placed in the toaster, and therefore, the likelihood of negative results is high. Therefore, even if a toaster includes a control to allow the user to choose not to toast both sides of a bagel, there would be no obvious proper orientation for loading the bagel corresponding to the control, so that this would limit the usefulness of the feature to the user.

In addition, conventional toasters do not permit non-toasting functions such as defrosting food items or reheating food items after toasting.

Lastly, conventional toasters do not take into account differences in the original state of the item to be toasted, such as frozen foods, i.e., frozen waffles, and non-frozen foods, i.e., bread.

OBJECTS AND SUMMARY OF THE INVENTION

Accordingly, it is an object of the present invention to provide a toaster that overcomes the aforementioned deficiencies of the prior art.

It is another object of the present invention to provide a toaster having an automatic shutoff feature. For example, the present invention allows a minimum overtravel built into the lever/yoke mechanism of the toast rack lever to permit movement of the lever past the lowest position of the toast in the chamber so that after the toasting cycle, the lever/yoke mechanism is released to travel a minimum distance sufficient to ensure that the electrical contacts are fully open prior to engaging the toast rack. Therefore, if the bread or pastry is jammed, the heating elements will have already been shut off, and there will be no further burning of the food.

It is still another object of the present invention to provide a toaster that includes a means for indicating to the user that the bread is jammed, such as by a flashing LED and/or audible buzzer.

It is yet another object of the present invention to provide a toaster having an improved toast lever mechanism for smooth operation. For example, the present invention includes a plastic or other non-metallic part which is connected to the free end of the bread racks and is formed by a pin or the like which functions as a precise guide in a vertical slot in the heat shield or other metal surface adjacent the rear wall of the toaster. This allows the bread racks to be supported and guided at both ends thereof, which gives the benefit of more precise control and reduced chatter.

It is a further object of the present invention to provide a toaster with a toast shade control display incorporating, for example, a radial array of light emitting diodes (LEDs) on the printed circuit board inside the toaster which transfer light via light pipes to the exterior surface of the toaster. For example, the LEDs are arranged in a radial pattern around a rotary control knob, and are sequentially turned on and off as the knob is rotated by the user for selecting the desired toast shade. In addition, the display may include a countdown feature which would display a decreasing or increasing light bar effect approaching the selected LED as the toast cycle is progressing to its conclusion. A variation to the light bar effect may be a moving or flashing LED that would progress to its conclusion.

It is a still further object of the present invention to provide a toaster with an improved toasting operation for bagels. For example, an embodiment of the present invention includes slots which are shaped to indicate the proper orientation of the bagel so that when a user specifies a bagel as the food item, only the sliced planar surface, and not the outer curved surface, of the bagel half will be toasted. The toaster control may include a pushbutton or mechanical switch to indicate that the food item is a bagel. If a bagel is selected, then the outer heating elements or cards are turned off by means of a switch or relay. Another variation may allow for the outer heating elements or cards to be turned "off" at a reduced time to allow light toasting on the outer curved surface of the bagel half.

It is a yet further object of the present invention to provide a toaster with additional control selection to allow for non-toasting functions of the toaster, such as defrosting food items or reheating food items after toasting. For example, this selection uses the same heating control (that is, the same voltage, current, etc.) but with a reduced cycle time.

It is another object of the present invention to provide a toaster with a pushbutton selection that allows the user to toast frozen items such as frozen waffles. For example, the electronics would add a preset amount of time to the normal toast cycle to compensate for the defrosting of the item before the actual toasting cycle occurs.

The above and other objects, features and advantages of the present invention will become readily apparent from the following detailed description thereof which is to be read in connection with the accompanying drawings.

DETAILED DESCRIPTION

Referring to the drawings in detail, a toaster 10 according to an exemplary embodiment of the present invention includes a toaster housing 12 of a generally rectangular parallelepiped configuration with opposite side walls 14 connected together by opposite end walls 16, a bottom wall 18 and a top wall 20.

Two adjacent and separated toasting chambers 22 are formed in toaster housing 12. Each toasting chamber 22 is open at the upper end thereof through openings 24 in top wall 20. In accordance with an exemplary aspect of the present invention, as will be understood from the discussion hereinafter, each toasting chamber 22 and corresponding opening 24 has a generally rectangular configuration, except that, for example, the outer sides 26 are bowed outwardly toward the respective side wall 14 of toaster housing 12. With this arrangement, toasting chambers 22 are adapted to easily accept sliced bagel halves therein, with the bagel halves being oriented in a predetermined relation, that is, with the outer surfaces of each bagel half always facing outwardly, and the inner cut surfaces of each bagel half always facing inwardly. Thus, bagel halves always have a predetermined orientation in each toasting chamber 22. It is foreseen that other predetermined orientations can also be employed.

Figure 1:
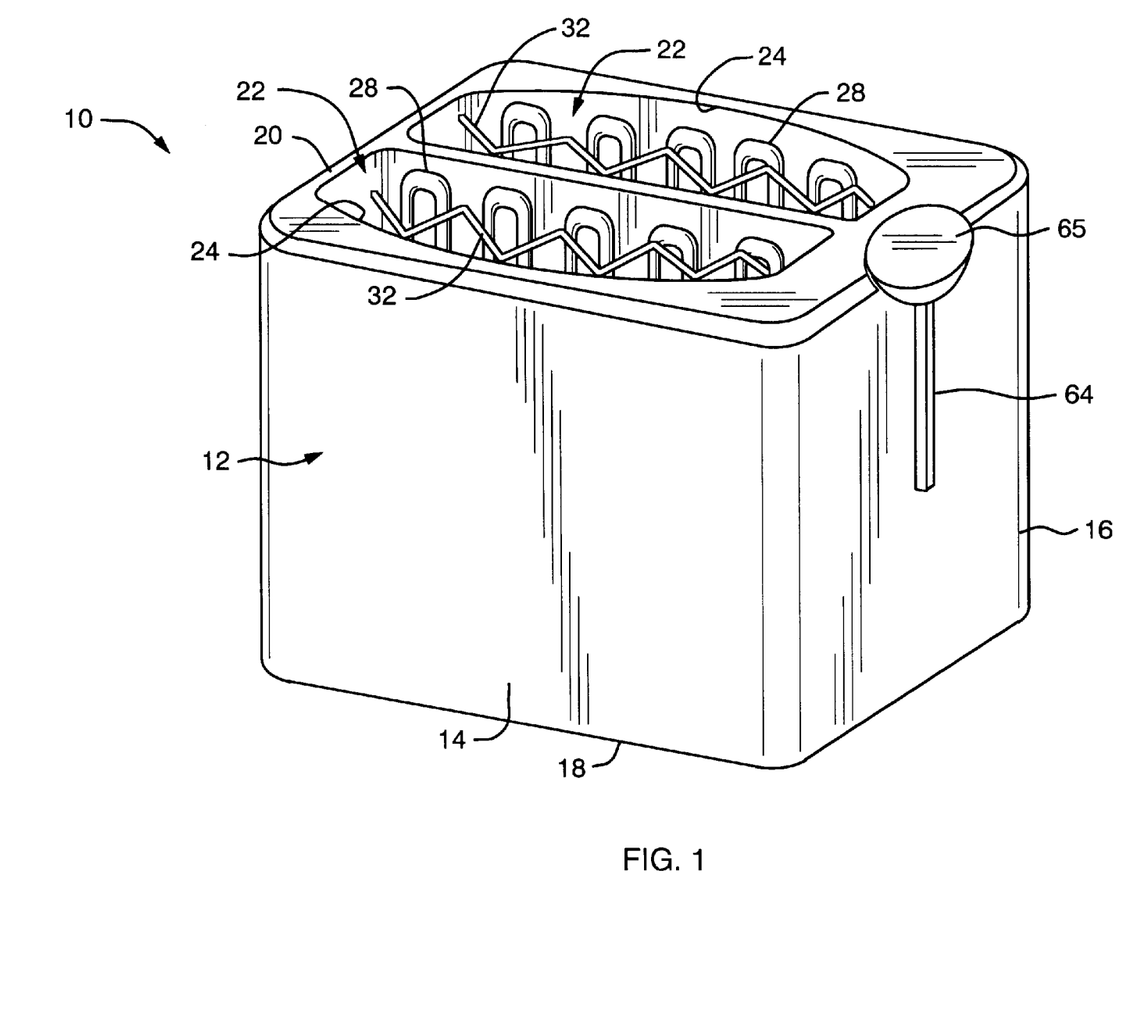
FIG. 1 is a perspective view of a toaster according to an exemplary embodiment of the present invention.
Figure 2:
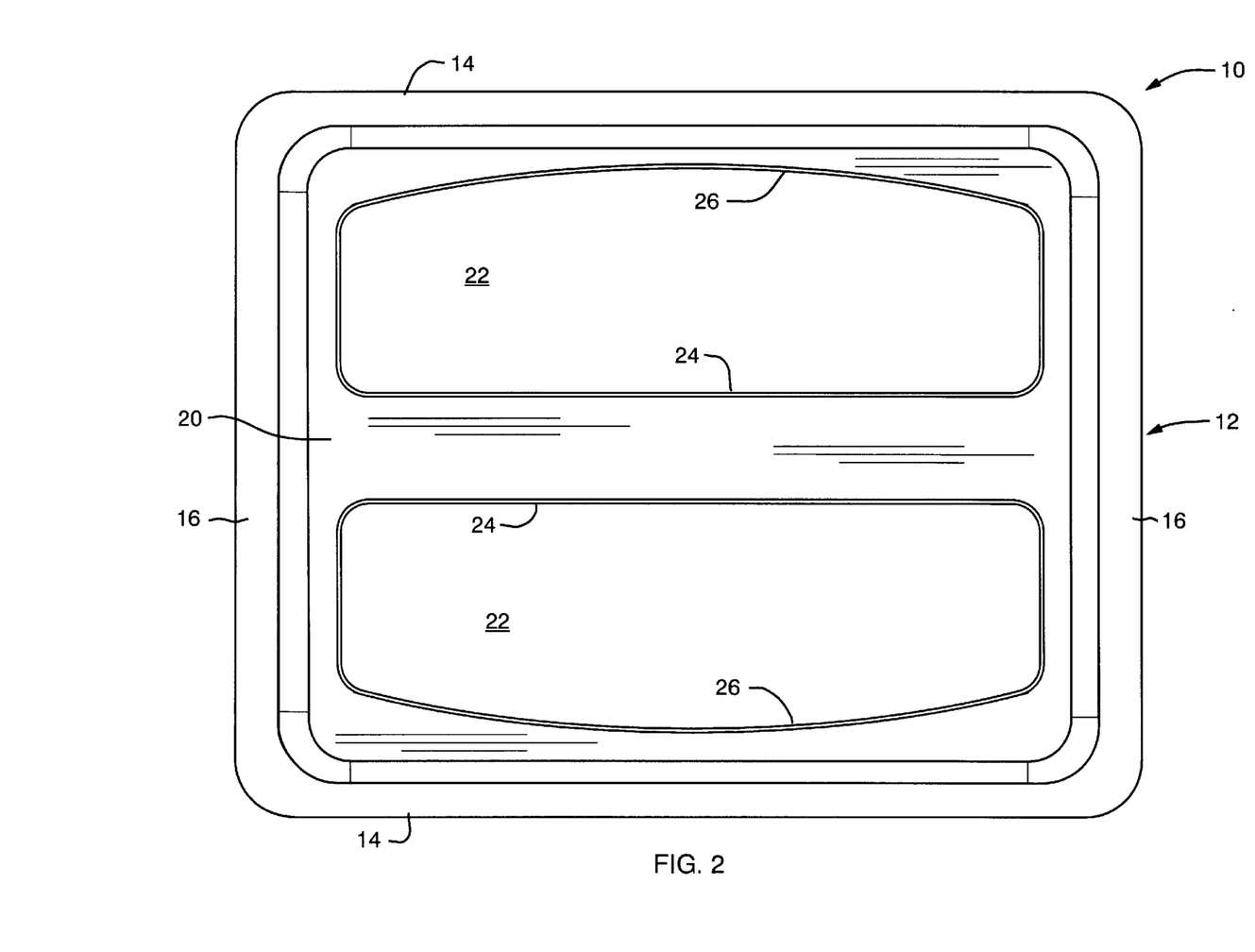
FIG. 2 is a top plan view of the toaster of FIG. 1, with the heating elements, wire mesh shields and toast racks removed.
Figure 4:
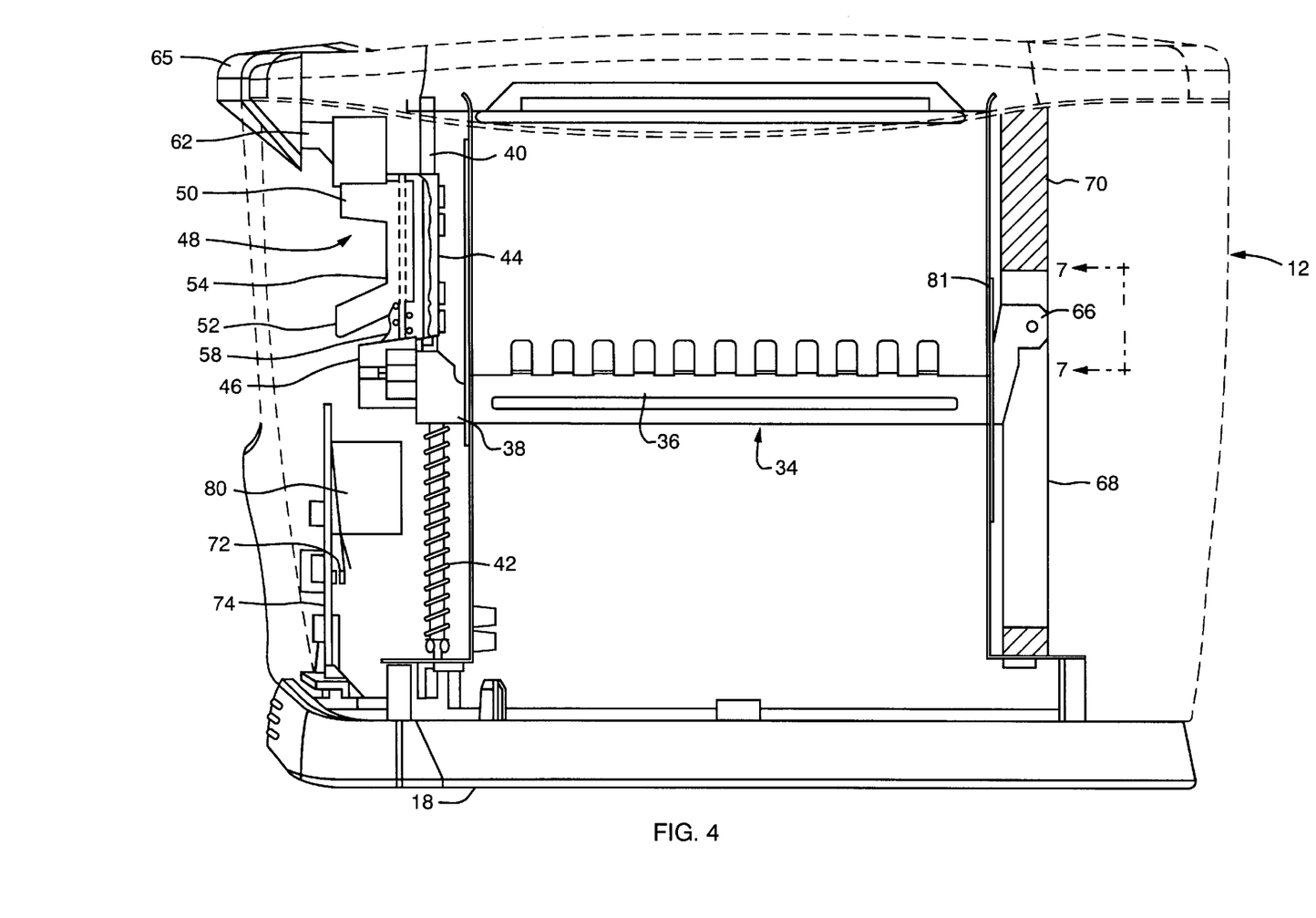
FIG. 4 is a side elevational view of inner operating parts of the toaster of FIG. 1 in an inoperative position, with the housing shown in phantom.
Figure 5:
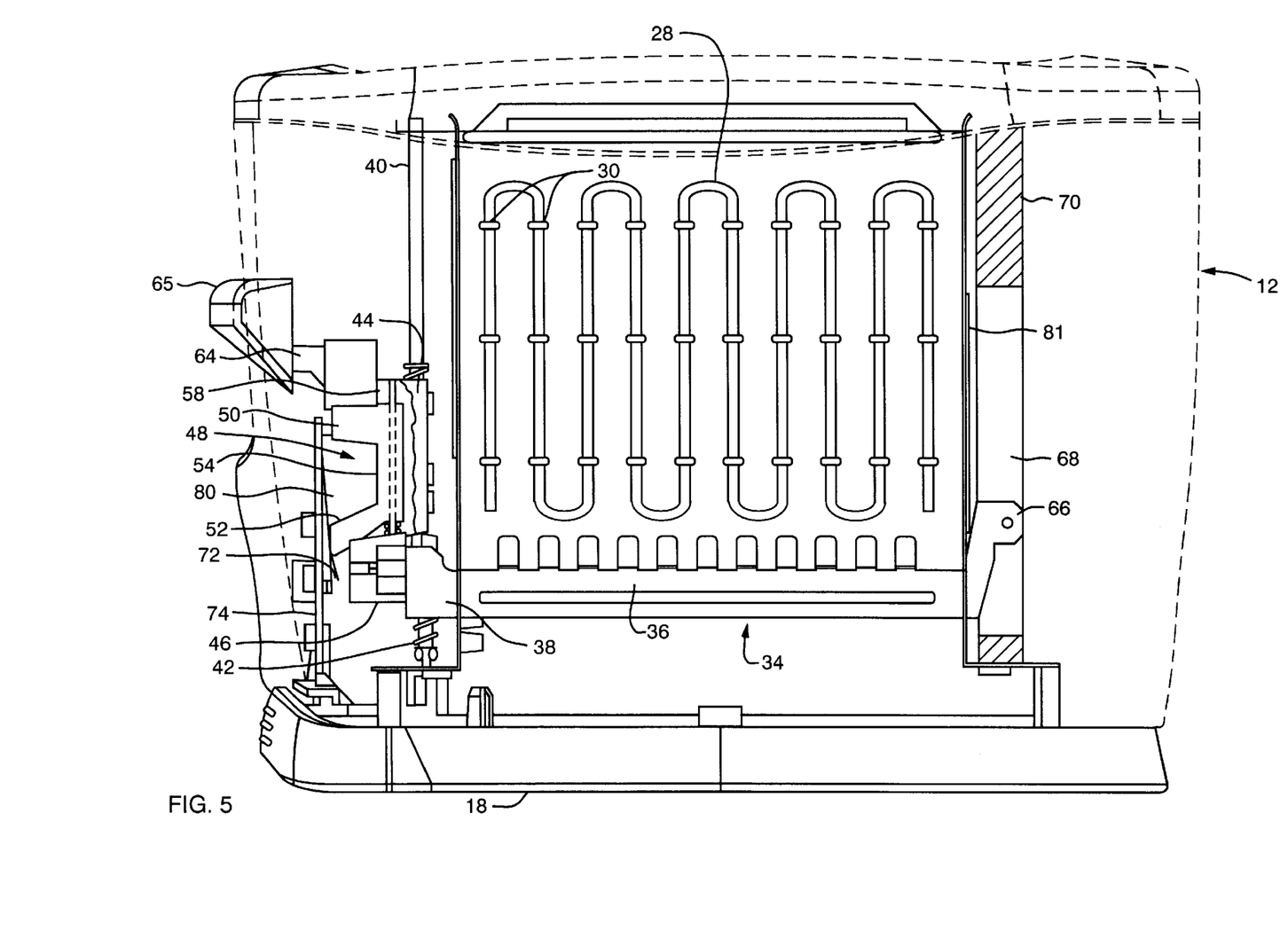
FIG. 5 is a side elevational view similar to FIG. 4, but in a toasting position.
Figure 6:
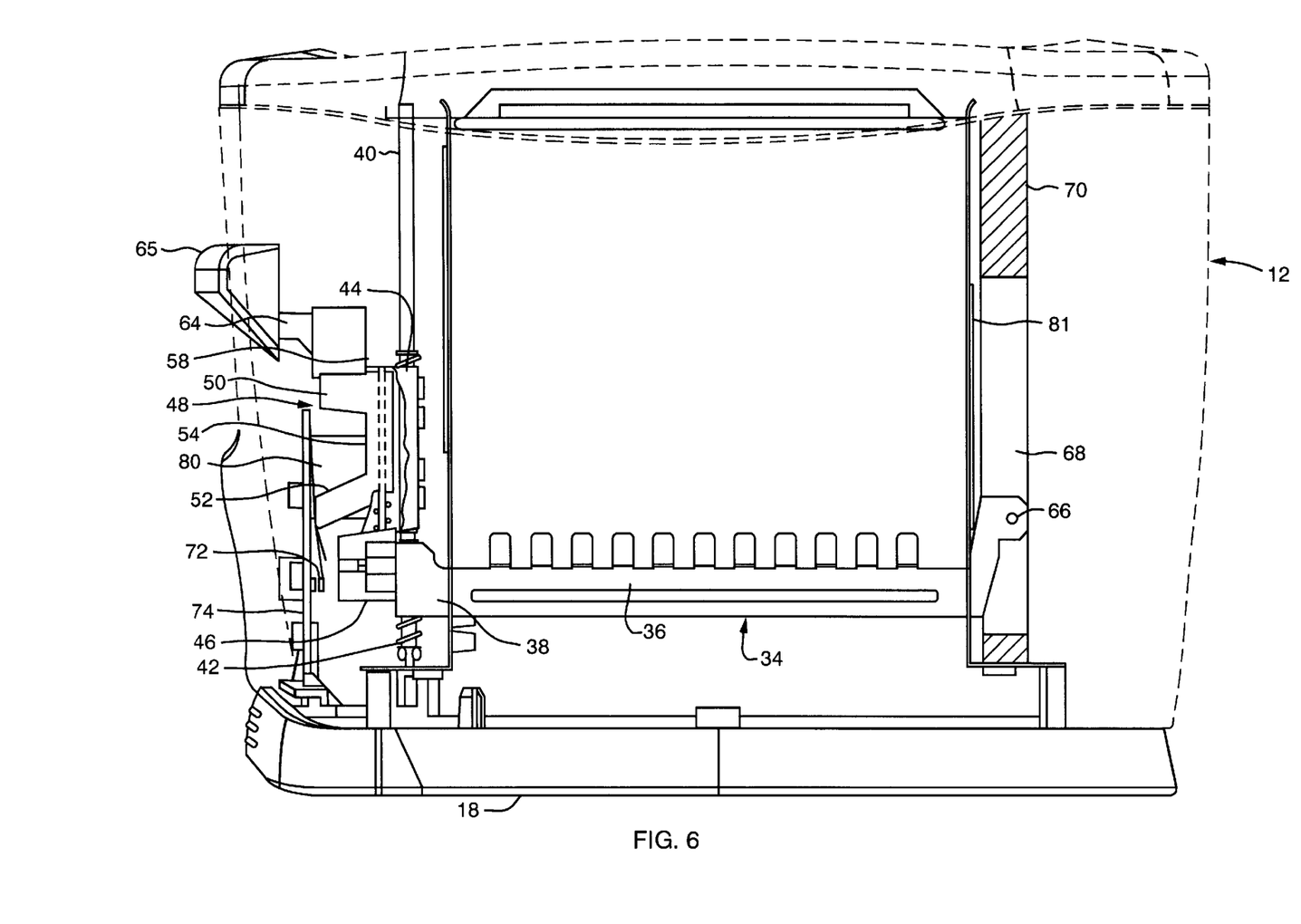
FIG. 6 is a side elevational view similar to FIG. 4, but in a safety shutoff position after a toasting operation has been completed.
Figure 7:
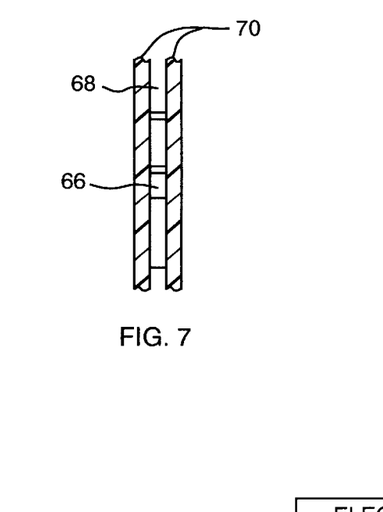
FIG. 7 is an end elevational view of a portion of the inner operating parts of FIG. 4, viewed from line 7—7 thereof.

Heating elements 28, such as heating coils or heating cards, are secured within toaster housing 12 on opposite sides of each toasting chamber 22, for example, by wire ties 30 or any other suitable arrangement, as shown best in FIGS. 1 and 5, as is conventional. Alternatively, heating elements 28 can be wound around a mica card from bottom to top and fastened by welding to metal contacts at both ends. The number of turns at the bottom compared to the number of turns at the top determines the effectiveness of achieving even browning in the toasting operation and can be adjusted accordingly. The heating elements 28 are merely shown schematically, and are omitted from FIGS. 2, 4 and 6 for the sake of clarity of the drawing. Further, as is conventional, a wire mesh or other shield 32 is provided in shielding relation to heating elements 28 to prevent the bread from directly contacting heating elements 28. Shield 32 is shown schematically in FIG. 1, but omitted from the remaining figures for the sake of clarity of the drawings. Exemplary control for variations in operating voltages for heating elements is described in U.S. Pat. No. 5,844,207 which is hereby incorporated by reference.

Figure 3:
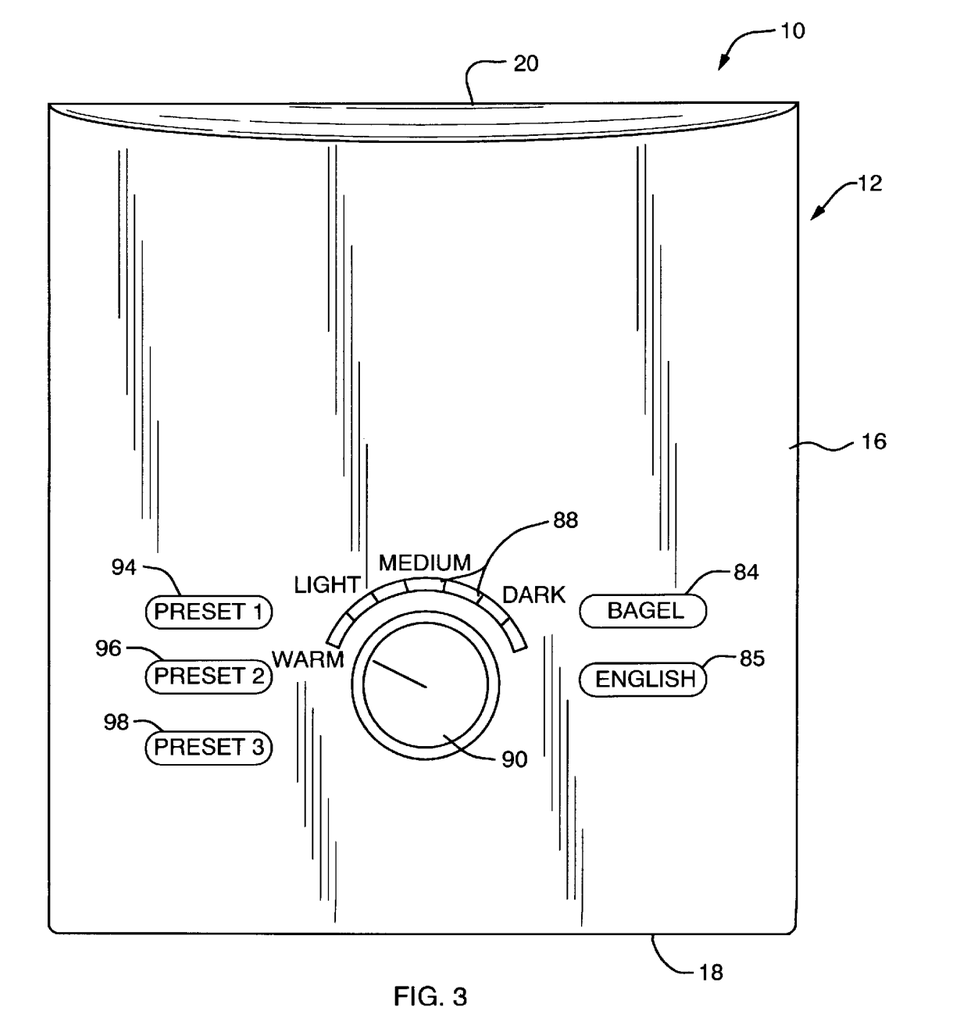
FIG. 3 is an end elevational view of the toaster of FIG. 1.

According to an exemplary embodiment of the present invention, openings 24 are shaped to indicate proper orientation of the bagel halves so that when a user specifies a bagel as the food item, only the sliced inner face, and not the outer curved surface of the bagel half will be toasted. In such case, a control pushbutton 84 (FIG. 3) or mechanical switch on one end wall 16 indicates that the food item is a bagel. If a bagel is selected, then the outer sides of the heating elements 28 are turned off by means of, for example, a switch or relay. Alternatively, the outer sides of the heating elements 28 may be turned "off" after a shorter time period than inner ones of heating elements 28 to allow light toasting on the outer curved surface of the bagel halves.

A bread rack 34 is positioned in each toasting chamber 22 between the respective heating elements 28 (FIG. 4), and is adapted to move up and down between the upper position shown in FIG. 4 and the lower toasting position shown in FIG. 5. Bread racks 34 are omitted from FIG. 2 for the sake of clarity of the drawing. Each bread rack 34 includes, for example, a lower, horizontally oriented, supporting bar 36 on which a food item, such as bread, is supported. One end of each supporting bar 36 is connected with, for example, an enlarged head 38 having a feature to mate with the connecting member 46 of yoke housing member 44 that receives a vertical guide pole 40, the latter being secured at upper and lower ends thereof to the toaster chassis. A coil spring 42 is positioned on guide pole 40 below enlarged head 38 so as to normally bias enlarged head 38, and thereby bread racks 34 upwardly to the inoperative position shown in FIG. 4.

Yoke housing 44 is positioned, for example, above enlarged head 38 and also is slidable on vertical guide pole 40. A bifurcated yoke 48 is slidably mounted to yoke housing 44. For example, yoke 48 includes an upper lateral extension 50, a lower lateral extension 52 and a vertical connecting member 54 which connects together lateral extensions 50 and 52 in vertically spaced relation. Yoke housing 44 is partially broken away in FIGS. 4–6 so that this can more easily be seen. Vertical connecting member 54 is slidably mounted on guide pole 40 and extends out, for example, through a vertically oriented, elongated slot 58 in yoke housing 44. The coil spring 42 is positioned about guide pole 40, below bifurcated yoke 48 so as to bias yoke 48 upwardly to the position shown in FIGS. 4 and 6.

Lateral extension 50 of yoke member 48 is connected to, for example, a lever 62 that extends out through an elongated slot 64 (FIG. 1) of toaster housing 12. A knob 65 is formed at the free end of lever 62 that extends out of elongated slot 64 for engagement by a user's finger, in order to move lever 62 between the positions shown in FIGS. 4 and 5.

In accordance with an exemplary aspect of the present invention, the opposite end of bread rack 34 includes a plastic or other non-metallic guide member 66, such as a pin or the like, which functions as a precise guide in a vertical slot 68 defined in the heat shield or other metal surface 70 at or near the rear wall of housing 12 of toaster 10, with a width of slot 68 being only slightly larger than a width of guide member 66. This allows bread racks 34 to be supported and guided at both ends thereof with a small tolerance, which gives the benefit of more precise control, a smoother operation of lever 62, and reduced chatter.

When bread racks 34 are moved down to the position of FIG. 4 by depressing knob 65 of lever 62, yoke 48 which is connected to lever 62 is pushed down guide pole 40, thereby compressing spring 42. Movement of yoke 48 also moves yoke housing 44 down along guide pole 40, thereby resulting in bread racks 34 moving down to the position of FIG. 5. Electromagnet 80 provides, for example, a stop in the downward direction.

Figure 8:
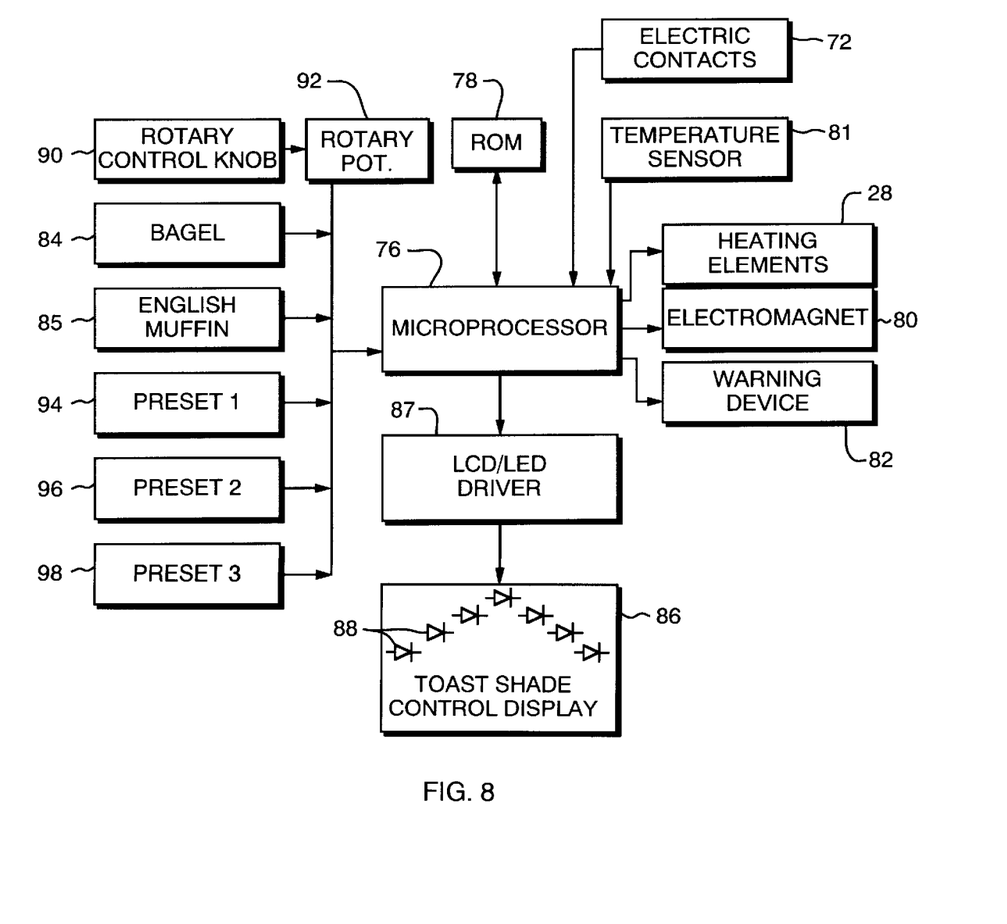
FIG. 8 is an exemplary block diagram of the circuitry for operating a toaster according to an embodiment of the present invention.

In this position, lower lateral extension 52 closes electrical contacts 72 connected to a circuit board 74, which supplies a signal to a conventional microprocessor 76 as illustrated in FIG. 8. A read only memory (ROM) 78 is connected with microprocessor 76 and has a predetermined program stored therein for operating microprocessor 76. In response to the closing of contacts 72, microprocessor 76 controls the supply of power to heating elements 28, thereby starting the toasting operation. At the same time, an electromagnet 80 positioned adjacent to yoke 48 is activated to hold yoke 48 in position for a time period determined by microprocessor 76 (e.g., determined by the software stored in ROM 78 and executed by microprocessor 76) and also to maintain the supply of power to heating elements 28. In this regard, timing should be accurate within, for example, plus or minus 7%. To accomplish this, a line frequency or crystal frequency is generally required for a time base. Thus, microprocessor 76 can use an RC or internal oscillator if calibrated from a line frequency input. Further, cycle time changes as the square of the input voltage, which will generally be within the range of, for example, 108–127 volts.

Further, actual times at each setting can be empirically determined so the software stored in ROM 78 corresponds to the same. As an example, for a first time heating operation or first cycle, for 120 volts at 60 Hz power applied, a light toast setting would be, for example, for 80 seconds, and a dark toast setting at 160 seconds. If a second toasting operation or second cycle is started thereafter, that is, after the toaster is already warm, the time settings would change, for example, to 60 seconds for a light toast setting and 120 seconds for a dark toast setting. For a third toasting operation or third cycle, the time settings would change, for example, to 50 seconds for a light toast setting and 100 seconds for a dark toast setting.

As discussed above, it sometimes occurs in known devices that, after the toasting operation has been completed, if a slice of toast or pastry becomes jammed at the bottom of the toast rack and the electrical contacts are not sufficiently opened to shut off the heating elements, there is no fail-safe device for shutting off power to the heating elements. This can result in the toast or pastry being overcooked or burnt, and more importantly, can result in more hazardous occurrences, such as a house fire, etc.

Such a circumstance is avoided according to an exemplary embodiment of the present invention. For example, when the toasting operation is completed, that is, the time set for toasting has ended, microprocessor 76 deactivates electromagnet 80. As a result, yoke 48 is no longer held by electromagnet 80 and is free to move. At such time, yoke 48, which is no longer restrained, is biased up along guide pole 40 by spring 42 to the position shown in FIG. 6. In this position, although bread racks 34 are still in the lowered position due to the toast or pastry jam, lower lateral extension 52 no longer closes the electrical contacts 72, whereby heating elements 28 are no longer activated. Therefore, even though the toast or pastry is stuck at the bottom with bread racks 34, the heating elements are no longer on, thereby eliminating any danger from an overheating operation.

Thus, an exemplary embodiment of the present invention allows a minimum overtravel of yoke 48 and lever 62 to permit a small movement of yoke 48 past the lowest position of the toast in toasting chambers 22 so that after the toasting cycle, such small movement of yoke 48 is sufficient to ensure that contacts 72 are fully open before a person engages bread racks 34 to release the jammed toast or pastry. For example, there can be an approximately ¼" play (e.g., movement) so that the yoke housing 44 is limited in its downward movement by the end of the elongated slot 64 in the toaster housing 12 that limits the bread rack 34 travel. Thus, the bread rack 34 reaches its end of travel condition approximately ¼" before the bifurcated yoke 48 contacts the electromagnet 80. At the end of a cycle, the bias of spring 42 returns the bifurcated yoke 48 to the upward bias and causes it to travel approximately ¼" to push against the yoke housing 44. Therefore, if the bread or pastry is jammed, heating elements 28 will have already been shut off, and there will be no further burning of the food as the contacts controlling power to the heating element 28 will be in full open position ensured by the ¼" travel of the bifurcated yoke 48.

In addition, toaster 10 may include a warning device 82 for warning the consumer that the bread is jammed. Warning device 82 can be a visible warning device, such as a flashing light emitting diode (LED) and/or an audible warning device, such as an audible buzzer or other alarm that is activated by microprocessor 76. In this regard, a position sensor can be provided to determine the lowered position of bread racks after a toasting operation has been completed.

As discussed above, an exemplary embodiment of the present invention includes slots or openings 24 which are shaped to indicate proper orientation of a sliced bagel half so that when a user specifies a bagel as the food item, only the planar sliced inner surface, and not the curved outer surface, of the bagel half will be toasted. In addition to providing for the proper orientation of the bagel halves by the slots having a specific configuration, the present invention provides a control so that only the inner ones of heating elements 28 which face the sliced planar surface of the bagel are activated for heating. In this regard, for example, a pushbutton 84 or mechanical switch is provided on the end wall 16 opposite to lever 62, and when depressed, sends a signal to microprocessor 76 to indicate that the food item is a bagel, and microprocessor 76, in turn, then activates only the inner ones of heating elements 28. In other words, the outer ones of heating elements or cards 28 are turned off by means of a switch or relay.

Alternatively, microprocessor 76 may also turn on the outer ones of heating elements 28, but for a reduced amount of time in comparison with the inner ones of heating elements 28. This permits light toasting on the curved outer surface of the bagel halves.

In addition to the bagel pushbutton 84, toaster 10 can be set for toasting items other than toast and bagels, such as English muffins. In this regard, for example, an English muffin pushbutton 85 can be provided on the same end wall 16. The default setting if button 84 or button 85 is not depressed is the conventional toast setting.

It will be appreciated that, when either pushbutton 84 or pushbutton 85 is depressed, a signal will be sent to microprocessor 76 to change the toast settings, depending upon the software stored in ROM 78. For example, an English muffin could be twice the time of toast, and a bagel 20% less time than the English muffin.

As also discussed above, with many conventional toasters, there is no adequate display for indicating the shade of the toast, that is, such displays are not precise. An exemplary embodiment of the present invention provides a toast shade control display 86 incorporating, for example, a radial array of a plurality of light emitting diodes (LEDs) 88 on the same end wall 16 of housing 12 as pushbuttons 84 and 85. For example, LEDs 88 are arranged in an arcuate pattern around a rotary control knob 90 which the user adjusts for a darkness setting, that is, which controls a rotary potentiometer 92 to supply a signal to microprocessor 76. LEDs 88 are, for example, sequentially turned on and off as rotary control knob 90 is rotated by the user for selecting the desired toast shade. Accordingly, the user can easily determine the darkness setting. In other words, LEDs 76 identify the potentiometer setting, and the darkness control is thereby used by microprocessor 76 to control the toast time, and thereby the toast darkness.

In addition, display 86 may include a countdown feature which displays a decreasing light bar effect, approaching the preselected or darkness setting LED 88, as the toast cycle is progressing to its completion. In such case, the user would select the desired shade using the rotary control knob 90 and LEDs 88, and would then start the toast cycle by lowering toast lever 62 to its full bottom position. When the toast cycle starts, microprocessor 76 would, for example, activate LEDs 88 in a clockwise manner via an LED driver circuit 87, up to the darkness setting selected by the user. As time progresses in the toasting cycle, microprocessor 76 could control LEDs 88 to turn off progressively in a clockwise manner, starting from the lightest setting LED until the only light left on is the one LED 88 corresponding to the desired darkness shade. At the end of the toasting cycle, display 86 defaults to the medium setting. Alternatively, LEDs 88 can start extinguishing from the darkness setting to the lightest setting LED.

As also discussed above, conventional toasters do not permit non-toasting functions such as defrosting food items or reheating food items after toasting, and do not take into account differences in the original state of the item to be toasted, such as frozen foods, i.e., frozen waffles, and non-frozen foods, i.e., bread.

An exemplary embodiment of the present invention provides additional control selection to allow for non-toasting functions of the toaster, such as defrosting food items or reheating food items after toasting. This selection uses, for example, the same heating control, that is, the same voltage, current, etc., but with a very reduced cycle time (heating time). The user control would be at an extreme position of the shade control knob, but would operate separate from the LED display discussed above. In such case, the user control could be indicated by, for example, the word "WARM" or "REHEAT" printed at the extreme end of the shade select control knob 90. Alternatively, a first preset pushbutton 94 could be provided on the same end wall 16 of housing 12 as pushbutton 84, and which provides a signal to microprocessor 76 in order to set the heating time. For example, the warm cycle could be one-half the lightest setting time for the selected food.

Further, according to an exemplary embodiment of the present invention, toaster 10 is provided with a pushbutton selection that allows the user to toast frozen items such as frozen waffles. For example, the software stored in ROM 78 could add a preset amount of time, such as 30%, to the normal toast cycle to compensate for the defrosting of the item before the actual toasting cycle occurs. In this regard, a second preset pushbutton 96 or momentary tactile switch with a corresponding LED thereon that is caused to be illuminated by microprocessor 76 can be provided. It is noted that toast may be presumed, that is, the default, if no food select LED is lit. A third preset pushbutton 98 can be provided for a third food item.

Alternatively, a single rotary switch can be provided for all food items, with, for example, a liquid crystal display (LCD), in place of the pushbuttons. In such case, for example, three pictorial icons, and three identifying words could be provided on the LCD display. Thus, each time that a user turns the switch, the LCD display would let the user scroll through these icons. The function of the food select is therefore to set the type of food, and thereby alter the heating time set by the microprocessor.

Thus, the toasting time is a function of, for example, line voltage, cavity temperature sensed via a thermistor 81 in toasting chamber 22, the darkness control setting, the food select setting, the warm setting and the frozen setting. At the end of the toast time, electromagnet 80 is de-energized, allowing the power to be removed from heating elements 28, and toast lever 62 to be released.

Generally, switch settings are selected prior to the start of a toasting operation. However, if a different pushbutton is depressed after a toasting operation has started, the toasting activity may be modified from that time point as if these new settings were made initially.

After a cycle is completed, the darkness setting and food select input information should be retained, unless changed by the user. The warm and the frozen selections should be reset, and the LEDs turned off after a completed cycle.

When toaster 10 has been unplugged from its source of power, and then is plugged in again, a toast default setting should be assumed with no other special function selected.

In operation, the food select, darkness setting, warm and frozen selections are made, for example, by rotary control knob 90 and pushbuttons 84, 85, 94, 96 and 98, and then toast lever 62 is pushed down. Microprocessor 76 then energizes electromagnet 80 as soon as power contacts 72 are sensed closed. Microprocessor 76 determines the timing required based on, for example, the above selections, and whether this is the first, second, third or greater cycle, or alternatively, by the cavity temperature determined by thermistor 81 instead of the cycle counting.

For bagels, if the outer surface is set for heating as well, the bagel relay may be energized after a preset shortened time, for example, one-third of a cycle, to remove power from the outer ones of heating elements 28.

Further, the darkness control LEDs 88 between the LED corresponding to the set darkness and the minimum light setting LED are turned on. These LEDs 88 will turn off one at a time from minimum darkness LED to the darkness or set point LED as time expires. When time has expired, only the set point LED corresponding to the desired darkness setting, is left on. The time interval for each LED turning off should closely relate to the percentage of time elapsed, that is, if five LEDs 88 are lit at the start, only three LEDs should remain at half the cycle time.

If an LCD display is provided, during the toasting cycle a single digit LCD displaying the darkness setting changes to a three digit LCD showing time remaining to the end of the cycle (in minutes and seconds) and counts down as time is expiring. The digit countdown should be related to the elapsed time. Also, in such case, there can be icons as to the different darkness settings. However, the darkness icon selected for the darkness setting does not count down, but remains at the darkness setting mode. When the toast cycle is complete, the digit display will revert back to the single digit darkness setting (1–7).

Further, it is preferable that at a preset time, for example, three seconds, prior to the end of a toasting operation, a piezo buzzer will sound for a preset time, for example, one second. At the end of the toast time, electromagnet 80 and the bagel relay are de-energized.

Having described exemplary embodiments of the present invention with reference to the accompanying drawings, it will be appreciated that the present invention is not limited to those precise embodiments, and that various changes and modifications can be effected therein by one of ordinary skill in the art without departing from the scope or spirit of the invention as defined by the appended claims.

What is claimed is:

1. A toaster comprising:
    a housing having an upper wall with at least one opening;
    at least one toasting chamber in said housing, said at least one toasting chamber being accessible through said at least one opening;
    a bread rack in said toasting chamber for holding a food item thereon;
    heating coils at least partially surrounding each said toasting chamber;
    electric contacts for activation of said heating coils;
    a raising/lowering mechanism connected with said at least one bread rack for moving said at least one bread rack between a raised inoperative position and a lowered cooking position in said at least one toasting chamber and for engaging said electric contacts in said lowered cooking position to activate said heating coils, said raising/lowering mechanism including:
        a yoke housing connected with said at least one bread rack and slidably movable relative to said housing;
        a lever connected with said yoke housing for slidably moving said yoke housing;
        a yoke slidably movable relative to said yoke housing and closing said electric contacts when said at least one bread rack is in said lowered cooking position and said yoke is in a lowered position relative to said yoke housing; and
        a first spring for biasing said yoke upwardly to a raised position relative to said yoke housing;
    an electromagnet for holding said yoke in said lowered position relative to said yoke housing; and
    a control device for controlling said electromagnet to release said yoke after a predetermined cooking time, such that said spring moves said yoke upwardly to said raised position relative to said yoke housing to disengage said yoke from closing contact with said electric contacts, regardless of whether said at least one bread rack is moved to said upper inoperative position.

2. A toaster according to claim 1, wherein said raising/lowering mechanism further comprises:
    a guide pole mounted in said housing, with said yoke housing slidably positioned on said guide pole,
    said first spring normally biasing said yoke housing upwardly along said guide pole.

3. A toaster according to claim 2, wherein said first spring is disposed around said guide pole.

4. A toaster according to claim 1, wherein said control device comprises a microprocessor for controlling activation of said electromagnet in response to closing of said electric contacts by said yoke and a lapse of time.

5. A toaster according to claim 4, further comprising a warning device connected with said microprocessor for providing at least one of an audible and visible warning when said first spring moves said yoke upwardly to said raised position relative to said yoke housing to disengage said yoke from closing contact with said electric contacts, and said at least one bread rack remains in said lower cooking position.

6. A toaster comprising:
    a housing having an upper wall with at least one opening;
    at least one toasting chamber in said housing, said at least one toasting chamber being accessible through said at least one opening;
    a bread rack in said toasting chamber for holding a food item thereon;
    heating coils at least partially surrounding each said toasting chamber;
    a raising/lowering mechanism connected with said at least one bread rack for moving said at least one bread rack between a raised inoperative position and a lowered cooking position in said at least one toasting chamber, said raising/lowering mechanism including:
        a first lateral portion connected to one end of said at least one bread rack;
        a first guide mounted to said housing for guiding said first lateral portion with a small tolerance;
        a second lateral portion connected to an opposite end of said at least one break rack; and
        a second guide mounted to said housing for guiding said second lateral portion with a small tolerance.

7. A toaster according to claim 6,
    wherein said first lateral portion includes an enlarged head connected at said one end of each said bread rack; and
    further comprising a guide pole mounted in said housing and along which said enlarged head slides.

8. A toaster according to claim 6, wherein said second guide is disposed in a vertical slot adjacent a rear wall of said housing, with said vertical slot being only slightly larger than a width of said second lateral portion.

9. A toaster comprising:
    a housing having an upper wall with at least one opening having a generally rectangular configuration with one longer side being outwardly convex;
    at least one toasting chamber in said housing, said at least one toasting chamber being accessible through said at least one opening, each said toasting chamber having a generally rectangular parallelepiped configuration with one longer side being outwardly convex in correspondence with said outwardly convex longer side for receiving a bagel half therein in a predetermined orientation;
    a bread rack in each said toasting chamber for holding a food item thereon;
    inner and outer heating coils at least partially surrounding said toasting chamber; and
    a raising/lowering mechanism connected with said at least one bread rack for moving said at least one bread rack between a raised inoperative position and a lowered cooking position in said at least one toasting chamber.

10. A toaster according to claim 9, further comprising:
    a control device for controlling activation of said inner and outer heating coils for each said bread rack; and
    a bagel input signal device for sending a signal to said control device to activate only said inner heating coils for each said toasting chamber when said bagel input signal device is activated.

11. A toaster according to claim 9, further comprising:
    a control device for controlling activation of said inner and outer heating coils for each said bread rack; and
    a bagel input signal device for sending a signal to said control device to activate said outer heating coils for each said toasting chamber for a lesser time than said inner heating coils for each said toasting chamber, when said bagel input signal device is activated.

12. A toaster comprising:

a housing having an upper wall with at least one opening;

at least one toasting chamber in said housing, said at least one toasting chamber being accessible through said at least one opening;

a bread rack in each said toasting chamber for holding a food item thereon;

heating coils at least partially surrounding each said toasting chamber;

a raising/lowering mechanism connected with said at least one bread rack for moving said at least one bread rack between a raised inoperative position and a lowered cooking position in said at least one toasting chamber;

an input setting device for setting a toasting time by a user; and a visual indication device on an outer surface of said housing for visually indicating the toasting time set by the user.

13. A toaster according to claim 12, further comprising a control device for controlling said visual indication device to provide a countdown display on said visual indication device as toasting time progresses to the set toasting time.

14. A toaster according to claim 12, wherein said visual indication device includes a plurality of light emitting devices which are progressively illuminated or extinguished as the toasting time progresses to the set toasting time.

15. A toaster comprising:

a housing having an upper wall with at least one opening;

at least one toasting chamber in said housing, said at least one toasting chamber being accessible through said at least one opening;

a bread rack in each said toasting chamber for holding a food item thereon;

heating coils at least partially surrounding each said toasting chamber;

a raising/lowering mechanism connected with said at least one bread rack for moving said at least one bread rack between a raised inoperative position and a lowered cooking position in said at least one toasting chamber;

an input setting device for setting a desired food item to be heated by said heating coils; and a control device for controlling an activation time of said heating coils in response to said input setting device.

16. A toaster according to claim 15, wherein said control device increases an activation time of said heating coils to a time greater than a toasting time, in response to said input setting device indicating a frozen item to be heated.

17. A toaster according to claim 15, wherein said control device decreases an activation time of said heating coils to a time less than a toasting time in response to said input setting device indicating a food item is to be warmed or reheated.

18. A toaster comprising:

a housing having an upper wall with at least one opening having a generally rectangular configuration with one longer side being outwardly convex;

at least one toasting chamber in said housing, said at least one toasting chamber being accessible through said at least one opening, each said toasting chamber having a generally rectangular parallelepiped configuration with one longer side being outwardly convex in correspondence with said outwardly convex longer side for receiving a bagel half therein in a predetermined orientation;

a bread rack in each said toasting chamber for holding a food item thereon;

heating coils at least partially surrounding each said toasting chamber;

electric contacts in said housing for activation of said heating coils;

a raising/lowering mechanism connected with said at least one bread rack for moving said at least one bread rack between a raised inoperative position and a lowered cooking position in said at least one toasting chamber and for engaging said electric contacts in said lowered cooking position to activate said heating coils, said raising/lowering mechanism including:

a first lateral portion connected to one end of said at least one bread rack;

a first guide mounted to said housing for guiding said first lateral portion with a small tolerance;

a second lateral portion connected to an opposite end of said at least one bread rack; and a second guide mounted to said housing for guiding said second lateral portion with a small tolerance;

a yoke housing connected with said first lateral portion and slidably movable relative to said housing;

a lever connected with said yoke housing for slidably moving said yoke housing;

a yoke slidably movable relative to said yoke housing and closing said electric contacts when said at least one bread rack is in said lowered cooking position and said yoke is in a lowered position relative to said yoke housing; and a first spring for biasing said yoke upwardly to a raised position relative to said yoke housing;

an electromagnet for holding said yoke in said lowered position relative to said yoke housing;

an input setting device for setting a toasting time by a user, and a desired food item to be heated by said heating coils; and a control device for controlling said electromagnet to release said yoke after a predetermined cooking time, such that said spring moves said yoke upwardly to said raised position relative to said yoke housing to disengage said yoke from closing contact with said electric contacts, regardless of whether said at least one bread rack is moved to said upper inoperative position, and for controlling activation of said heating coils in response to said input setting device; and a visual indication device on an outer surface of said housing for visually indicating the toasting time set by the user.

* * * * *